United States Patent [19]

McCaulay

[11] 3,928,487

[45] Dec. 23, 1975

[54] ALKYLATION PROCESS UTILIZING HYDROFLUORIC ACID WITH A MINOR AMOUNT OF FLUOROSULFURIC ACID

[75] Inventor: David A. McCaulay, Homewood, Ill.

[73] Assignee: Standard Oil Company, Chicago, Ill.

[22] Filed: Nov. 27, 1974

[21] Appl. No.: 527,715

[52] U.S. Cl. .......................................... 260/683.51
[51] Int. Cl.² .......................................... C07C 3/54
[58] Field of Search..... 260/683.47, 683.48, 683.51, 260/683.58

[56] References Cited
UNITED STATES PATENTS

| | | | |
|---|---|---|---|
| 2,317,694 | 4/1943 | Ott | 260/683.47 |
| 3,766,293 | 10/1973 | Parker et al. | 260/683.58 |
| 3,778,489 | 12/1973 | Parker et al. | 260/683.47 |
| 8,383,581 | 1/1975 | Parker et al. | 260/683.58 |

Primary Examiner—Herbert Levine
Assistant Examiner—G. J. Crasanakis
Attorney, Agent, or Firm—James R. Henes; Arthur G. Gilkes; William T. McClain

[57] ABSTRACT

An improved process for alkylating at least one alkylatable isoparaffin with at least one alkylating agent selected from the class consisting of an olefin and an alkyl sulfate ester in the presence of a catalyst comprising a major amount of hydrofluoric acid and a minor amount of fluorosulfuric acid.

18 Claims, 2 Drawing Figures

ALKYLATION PROCESS UTILIZING HYDROFLUORIC ACID WITH A MINOR AMOUNT OF FLUOROSULFURIC ACID

The invention of this application is related to the inventions of the following applications filed simultaneously with this application and by the same applicant: Ser. No. 527,712 and Ser. No. 527,713.

BACKGROUND OF THE INVENTION

1. Field of the Invention

This invention relates to a method for alkylating an alkylatable isoparaffin with an alkylating agent in the presence of an acid alkylation catalyst. More particularly, this invention relates to a method for alkylating an alkylatable isoparaffin with an alkylating agent selected from the class consisting of an olefin and an alkyl sulfate ester in the presence of a mixture of hydrofluoric acid and fluorosulfuric acid as the alkylation catalyst.

2. Description of the Prior Art

In the petroleum industry, alkylation refers to the catalytic reaction of isoparaffins with light olefins, such as ethylene, propylene, butylenes, and amylenes, to produce highly branched paraffins, the alkylate. These branched paraffins are of high octane quality and have relatively low volatility. They are therefore desirable blending components for gasoline.

The concern over air pollution from automobile exhausts has stimulated interest in alkylation. Specifically, legislation in the United States has restricted the use of some ingredients in motor fuels. Limitations are being placed on gasoline additives such as lead-containing compounds, and limits on the aromatics content have been proposed. Alkylate is not only a highly satisfactory blend stock for present-day gasolines containing lead, but is also desirable in low-lead or no-lead blends. Thus, alkylation may become even more important to the refining industry as a means of producing gasoline with satisfactory antiknock and volatility characteristics.

In particular, isobutane-olefin alkylation, catalyzed by sulfuric acid or hydrofluoric acid, is an important and growing refinery process. United States alkylation capacity has approximately doubled in the past ten years and has now reached over 850,000 barrels per day. Despite the importance and extensive use of alkylation, two areas still remain where substantial improvements can be made: octane number is below potential, and catalyst consumption is high.

Octane numbers could be increased if the alkylation reaction could be made more selective. The ideal isobutane-olefin alkylation reaction is one wherein isobutane adds to a butene to give trimethylpentanes, which have, in general, the highest octane numbers. Reaction conditions are set to produce this high octane number product by maintaining high isobutane to olefin concentrations to minimize olefin-olefin reactions. Yet, in spite of this, about 40% of the olefin reactant polymerizes to a $C_{12}$ species, which reacts further to give a mixture of hydrocarbons from $C_5$ to $C_{13}$, having octane numbers ranging from 60–90. Therefore, suppression of the polymerization-related reactions would greatly improve gasoline quality.

The formation of by-products also results in high catalyst consumption. Acid-soluble impurities, such as complex polyolefinic hydrocarbons, and oxidative by-products, such as water and sulfonic acids, are the major undesirable by-products. These products dissolve in and react with the acid catalyst so that the spent catalyst has to be withdrawn and replaced by fresh acid continuously. The costs of replacing catalyst are substantial. Any lengthening of catalyst life would reduce costs considerably.

To this end, numerous alkylation catalyst systems have been investigated. Much research activity has been directed towards the use of additives and promoters in catalyst systems to increase yields, improve quality and reduce acid consumptions. For example, British Pat. No. 668,283 (1952) discloses a method for alkylating benzene, toluene, xylene, or nuclear-halogenated derivatives thereof with saturated hydrocarbon aldehydes, saturated hydrocarbon alcohols, and esters and ethers of saturated hydrocarbon alcohols in the presence of a catalyst system comprising hydrogen fluoride and fluorosulfuric acid. The catalyst system used in British Pat. No. 668,283 is specifically disclosed for use only in the alkylation of an aromatic compound with a saturated hydrocarbon aldehyde, a hydrocarbon alcohol, or an ester or ether of a saturated hydrocarbon alcohol.

On the other hand, the catalyst systems disclosed in U.S. Pat. Nos. 2,259,723; 2,387,162; 2,545,875; 2,591,367; 3,187,066; 3,221,071; and 3,766,293 are illustrative of catalyst systems for use in one-step processes for alkylating isoparaffins with olefins to produce highly branched isoparaffins. Cade, U.S. Pat. No. 2,545,875 (1951) discloses alkylation catalysts comprising concentrated hydrofluoric acid, concentrated sulfuric acid, concentrated phosphoric acid, halosulfonic acids, mixtures of the acids mentioned, and aluminum halide-hydrocarbon complexes. These catalysts are sometimes promoted with such materials as hydrogen halides, free halogens, and boron trifluoride. McAllester, U.S. Pat. No. 2,591,367 (1952) discloses alkylation catalyst comprising concentrated sulfuric acid, anhydrous or aqueous hydrogen fluoride, phosphoric acid, chlorosulfuric acid or fluorosulfuric acids, hydrofluoroboric acid, etc. The patent states that the catalyst system may be such individual catalyst acids, mixtures of such acids, or mixtures of one or more such catalyst with other materials having a beneficial effect on the reaction, for example, boron fluoride, phosphorus pentoxide, oxides of vanadium, zinc or cadmium phosphate, sulfur dioxide and/or trioxide. Nathan, U.S. Pat. No. 3,187,066 (1965) discloses alkylation catalysts which include mineral acids such as sulfuric acid, hydrofluoric acid, phosphoric acid, chlorosulfuric acid, fluorosulfuric acid, etc., which may be used either singly or in mixtures. Stahley, U.S. Pat. No. 3,221,071 (1965) discloses alkylation catalysts including at least one Friedel-Crafts or Lewis acid catalyst or such catalysts with promoters and states that such Lewis acids include hydrofluoric acid, sulfuric acid, phosphorus pentoxide-sulfuric acid mixtures, orthophosphoric acid, pyrophosphoric acid, and the like. However, the relevant disclosures of these patents were limited to the brief remarks stated hereinabove.

On the other hand, U.S. Pat. Nos. 2,259,723; 2,387,162; and 3,766,293 contain broader disclosures. Ballard et al., U.S. Pat. No. 2,259,723 (1941) discloses an alkylation catalyst comprising a mixture of sulfuric acid, halo-sulfonic acid, or mixtures thereof, and a hydrogen halide, specifically, a hydrogen halide of the class consisting of hydrogen bromide and hydrogen chloride. Matuszak, U.S. Pat. No. 2,387,162 (1945)

discloses an alkylation catalyst comprising concentrated hydrofluoric acid, concentrated sulfuric acid, mixtures of sulfuric and hydrofluoric acids, fluorosulfuric acid, chlorosulfuric acid, concentrated hydrofluoric acid containing small proportions of boron trifluoride, boron trifluoride-water complexes, phosphoric acid containing dissolved boron trifluoride, aluminum chloride-hydrocarbon complexes, and the like. Parker et al., U.S. Pat. No. 3,766,293 (1973) discloses an alkylation catalyst comprising a major amount of a strong acid catalyst comprising fluorosulfuric acid and a minor amount of one or more catalyst promoters comprising inorganic acids like hydrofluoric acid and sulfuric acid.

Thus far, no one has disclosed the specific components and the specific proportions thereof that are used in the catalyst system of this invention to thereby produce the unexpected advantages of inhibiting undesirable side reactions, increasing catalyst lifetime, producing a maximum yield of high-octane hydrocarbons, and producing a maximum octane number alkylate.

SUMMARY OF THE INVENTION

The method of this invention is an improvement of a process for conducting a liquid-phase alkylation of at least one alkylatable isoparaffin with at least one alkylating agent selected from the class consisting of an olefin and an alkyl sulfate ester in the presence of a mixture of hydrofluoric acid and fluorosulfuric acid as the alkylation catalyst, under alkylation conditions, and in an alkylation reactor, to thereby produce hydrocarbons boiling in the gasoline range. The improvement comprises producing a maximum yield of high-octane hydrocarbons and a maximum-octane product and of extending the effective life of the catalyst, by reacting a mixture containing at least one said alkylatable isoparaffin and at least one said alkylating agent in the presence of a catalyst comprising a major amount of hydrofluoric acid and a minor amount of fluorosulfuric acid.

The alkylatable isoparaffin used in the method of this invention preferably contains from 4 to 10 carbon atoms and more preferably is isobutane. The alkylating agent used in the method of this invention is preferably an olefin containing from 3 to 10 carbon atoms, more preferably a mono-olefin containing from 3 to 5 carbon atoms, even more preferably a mono-olefin containing 4 carbon atoms, and most preferably a straight-chain mono-olefin containing 4 carbon atoms. In the most preferred embodiment of the method of this invention, the alkylating agent is a straight-chain monoolefin containing 4 carbon atoms, the alkylatable isoparaffin is isobutane, and trimethylpentanes are produced.

The catalyst used in the method of this invention preferably comprises hydrofluoric acid in an amount in the range of from at least 50 to about 98 weight percent of the catalyst and fluorosulfuric acid in an amount of at least 2 weight percent of the catalyst and more preferably comprises hydrofluoric acid in an amount in the range of from at least 60 to about 85 weight percent of the catalyst. Most preferably, the catalyst used in the method of this invention consists essentially of hydrofluoric acid and fluorosulfuric acid.

The method of this invention is conducted under at least sufficient pressure to maintain the alkylatable isoparaffin, the alkylating agent, and the catalyst substantially in the liquid phase under the conditions obtained. The method of this invention is conducted preferably at a temperature in the range of from about −30°C. to about 30°C. and more preferably at a temperature in the range of from about −15°C. to about 20°C.

The volume of alkylating agent per volume of catalyst per hour -- that is, the volume hourly space velocity (VHSV) -- in the method of this invention is preferably in the range of from about 0.05 to about 5.0 and most preferably in the range of from about 0.1 to about 2.0.

DETAILED DESCRIPTION OF THE INVENTION

Figure 1:
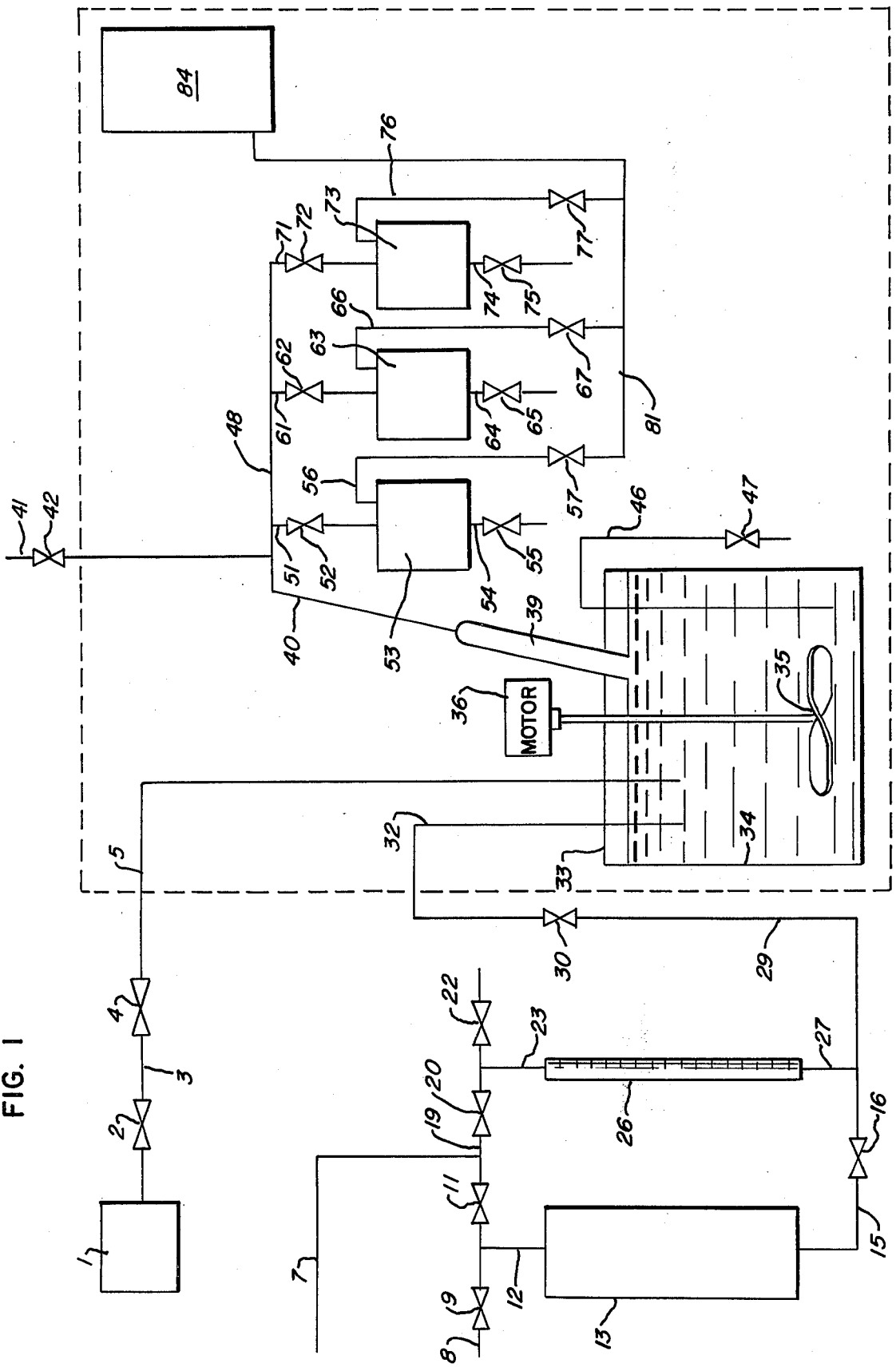
FIG. 1 is a schematic diagram of the system and apparatus used for alkylations performed using the method of this invention, with continuous flow of the hydrocarbon feed.

It has been found that the use of a composite containing hydrofluoric acid and fluorosulfuric acid as the catalyst is an alkylation reaction is advantageous relative to the use of a number of other alkylation catalyst systems.

The catalyst composite of this invention possesses an advantage over an alkylation catalyst containing fluorosulfuric acid alone. Fluorosulfuric acid is relatively inexpensive, is stable, and boils without decomposition at 163°C. It is a stronger acid than sulfuric acid, by a factor of 10, so that it can tolerate much more acid-soluble impurity before losing its effectiveness as an alkylation catalyst. Also, it is less viscous, has a lower freezing point, and has a greater solubility for isobutane than does sulfuric acid. These factors would result in a more selective reaction because they make mass-transfer of isobutane into the catalyst phase easier. The properties of fluorosulfuric acid indicate that it could be a good alkylation catalyst, but prior experience in the alkylation field has indicated that it was not possible to control the greater strength of fluorosulfuric acid. Fluorosulfuric acid produces excessive amounts of unwanted oxidation by-products and can not compete with sulfuric acid as an effective alkylation catalyst. I have found, however, that the addition of hydrofluoric acid to the fluorosulfuric acid results in the suppression of the oxidative tendencies of fluorosulfuric acid.

The catalyst composite of this invention also possesses an advantage over an alkylation catalyst containing sulfuric acid alone. During alkylation, undesirable, acid-soluble by-products (commonly called diluent or "red oil"), such as complex polyolefinic hydrocarbons and oxidation products are produced. These products dissolve in and dilute or react with the acid alkylation catalyst so that the catalyst eventually loses its effectiveness. Thus, spent catalyst must be continuously withdrawn and replaced by fresh catalyst. The catalyst composite of this invention can tolerate much larger amounts of the acid-soluble by-products before losing its effectiveness than can alkylation catalyst systems containing only sulfuric acid. Thus, the catalyst composite of this invention does not have to be withdrawn and replaced as rapidly as the alkylation catalyst systems containing only sulfuric acid.

The catalyst composite of this invention also displays increased selectivity in the production of the desired alkylate products, trimethylpentanes. This increased selectivity results when the catalyst system has the critical composition of at least 50 weight percent of hydrofluoric acid and at least 2 weight percent of fluorosulfuric acid. Under these conditions, the selectivity of the composite catalyst system of this invention is superior to the selectivities of catalyst systems made up of either sulfuric acid alone or composites of hydrofluoric acid and fluorosulfuric acid containing less than 50 weight percent of hydrofluoric acid and less than 2 weight percent fluorosulfuric acid.

The catalyst system of this invention is useful in the alkylation of any suitable alkylatable compound with any alkylating agent in any reactor and flow system conventionally used in alkylation. Suitable alkylatable compounds include isoparaffins and organic compounds containing isoparaffinic groups. Suitable alkylating agents include olefins and alkyl sulfate esters. In particular, the alkylation reaction may be carried out in any suitable form of apparatus and with a variety of isoparaffins and olefins, such as are capable of entering into the low-temperature alkylation reaction in the presence of the catalyst system of this invention.

Olefins are rapidly and nearly irreversibly absorbed in the acid alkylation catalyst and can undergo undesirable polymerization reactions in the acid phase. In order to limit such undesirable side reactions, the concentration of olefins in the acid phase must be kept at a minimum. Reactor design should also minimize high local concentrations of olefins wherever olefins are added to the reactor. Further, a relatively high ratio of isoparaffin-to-olefin in feed to the reactor is conducive to obtaining the desired reaction products. Since the isoparaffinic products in the alkylate can also be alkylated, a high concentration of isoparaffinic reactant in the reactor effluent also has the effect of minimizing undesirable secondary reactions.

Good reactor performance and good alkylate quality require that the acid and hydrocarbon in the reaction zone be sufficiently agitated to form an emulsion, with acid as the continuous phase. Since the alkylation reaction takes place in the acid phase, and since high degrees of agitation are desired, the acid-continuous emulsion is preferred. The acid-to-hydrocarbon volume ratio in the emulsion should be greater than 1 in order to achieve a hydrocarbon-in-acid emulsion. The exact ratio, being influenced by acid strength, feedstock composition, and mixer characteristics, varies from unit to unit.

Undesirable side reactions occur at higher temperatures, and generally use of lower temperatures results in better quality alkylate, that is, higher octane number alkylate. The reaction pressure need only be high enough to ensure that the hydrocarbons and acid catalyst are liquids at the desired reaction temperature.

EXAMPLES 1-31

Examples 1-31 involve alkylations employing continuous flow of the hydrocarbon feed. The mixtures of olefins were supplied by Matheson Gas Products Company. The catalyst were prepared from materials having known concentrations. The alkylations were performed using the apparatus and system shown diagrammatically in FIG. 1.

At the start of each run, with needle valves 42, 52, 62, 72, 57, 67, and 77 open and needle valves 4, 30, 47, 55, 65, and 75 closed, the closed system shown within the dotted lines in FIG. 1 was pressurized up to the desired reaction pressure with nitrogen entering the system through line 41. Then, needle valve 42 was closed. Next, with needle valves 9, 16, 20, 22, and 30 closed and with needle valve 11 open, nitrogen passed through stainless steel lines 7, 8, and 12 and into reservoir 13 in order to raise the pressure on the acid catalyst stored in reservoir 13 up to a level higher than the reaction pressure. Then needle valve 11 was closed, and needle valve 22 was opened in order to attain atmospheric pressure in graduated Kel-F tube 26 and stainless steel lines 23, 27, and 29. Next, valve 16 was opened, and acid catalyst was allowed to flow from reservoir 13, through stainless steel lines 15 and 27, and into tube 26 until tube 26 contained the desired volume of catalyst. The level of catalyst in tube 26 was measured.

Then, valves 16 and 22 were closed, and valves 21 and 30 were opened so that nitrogen flowed from line 7, through stainless steel lines 19 and 23, and into tube 26 and forced the desired volume of catalyst from tube 26, through stainless steel lines 27, 29, and 32 and into 70-milliliter stainless steel autoclave 34, through its top 33. Autoclave 34 was equipped with magnetic stirrer 35 and stirring motor 36 and was supplied by Autoclave Engineers, Inc., Erie, Pennsylvania. Autoclave 34 was filled to about one-half of its volume with a single batch of acid catalyst. When the desired amount of catalyst had passed into autoclave 34, valves 20, 22, and 30 were closed, and the level of catalyst remaining in tube 26 was measured. The volume of catalyst delivered was determined from the difference in levels of the catalyst in tube 26 before and after delivery of catalyst from tube 26 to autoclave 34.

With needle valve 4 at the intersection of lines 3 and 5 closed, pump 1 was pre-set manually so that the pressure in line 3 was slightly higher than the pressure in line 5. Then, pumping the hydrocarbon reactants into autoclave 34 commenced. A mixture of isobutane and the butylenes was continuously pumped at a rate of about 30 milliliters per hour by Ruska 500-milliliter syringe-type pump 1, from a container (not shown), through stainless steel lines 3 and 5 and into autoclave 34 through its top 35. Check valve 2 in line 3 prevented backflow of material in line 3, and needle valve 4 served as an on-off control. The flow rate of the hydrocarbon mixture in line 5 was regulated by a setting on the Ruska pump that controlled the movement of the piston.

The acid catalyst and hydrocarbons were mixed by stirrer 35 so that a hydrocarbon-in-acid emulsion would form and so that the alkylation reaction would occur. Since alkylation is highly exothermic, autoclave 34 was maintained at the desired reaction temperature in a cooling bath (not shown) containing copper coils through which a solution of ethylene glycol refrigerant flowed. This emulsion passed into settler 39, which was a transparent Kel-F tube supplied by Auburn Plastic Engineering, Chicago, Illinois.

The hydrocarbon product separated from the emulsion in settler 39 and passed overhead through stainless steel line 40 and into stainless steel line 51 containing needle valve 52 and into stainless steel receiver 53. The separated acid continuously dropped back from tube 39 into autoclave 34. Needle valves 55, 62, and 72 in stainless steel lines 54, 61, and 71, respectively, were closed. During this time, needle valve 57 in stainless steel line 56 was open and needle valves 67 and 77 in stainless steel lines 66 and 76, respectively, were closed so that the empty space in vessel 84 acted as a ballast to keep the pressure nearly constant as receiver 53 gradually filled with liquid product.

After the alkylation had proceeded for a first time period, needle valves 52 and 57 were closed, and needle valves 62 and 67 were opened, so that the hydrocarbon product in line 48 then passed into stainless steel receiver 63. After the alkylation had proceeded for a second period of time, needle valves 62 and 67 were closed, and needle valves 72 and 77 were opened, so that the hydrocarbon product in line 48 then passed into stainless steel receiver 73. Stainless steel receivers 53, 63, and 73 were supplied by Hoke Incorporated, Cresskill, N.J. When it was desired to collect alkylate produced during still more periods, additional receivers (not shown) in additional stainless steel lines (not shown) containing additional needle valves (not shown) were employed. Pressure ballast vessel 84 was a large, closed vessel which served to prevent a large build-up of pressure during long runs.

Shortly after hydrocarbon products had been collected in a receiver, the hydrocarbon products were removed therefrom by opening needle valves 55, 65, and 75 in lines 54, 64, and 74, respectively; and these hydrocarbon products were analyzed by gas chromatography. Isobutane was removed from these hydrocarbon products by fractionation. The remaining hydrocarbon fraction was the alkylate and was analyzed by gas chromatography. At the end of the run, the alkylates from selective sequential batches were combined, and knock tests (CFR, Research Method and Motor Method) were performed on this combined alkylate to determine the octane numbers.

At the end of a run, stirring in autoclave 34 was stopped, and the reaction mixture therein was allowed to settle and separate into an acid phase and a hydrocarbon phase. Then needle valve 47 in stainless steel line 46 was opened so that a sample of acid from autoclave 34 would pass through line 46 for collection and analysis.

The withdrawn sample of acid catalyst was titrated with standard base. The type of titration to determine acid strength at the end of a run differed from run to run, depending upon the particular acid catalyst used. If the acid catalyst was sulfuric acid or hydrofluoric acid alone, the acid sample was simply titrated with standard sodium hydroxide to determine the acid concentration. If the acid catalyst was a mixture of hydrofluoric acid and fluorosulfuric acid, a batch of the acid sample was first titrated with standard sodium hydroxide to determine the total acid concentration. This first titration was performed at a low temperature, for example, 0°C., in order to suppress the hydrolysis of fluorosulfuric acid. The titrated mixture was then heated for several hours at about 100°C. in a closed teflon bottle in order to hydrolyze fluorosulfate ion which was produced in the first titration, to form a mixture of hydrofluoric and sulfuric acids, which was then titrated with standard sodium hydroxide to determine the concentration of fluorosulfuric acid alone. The hydrofluoric acid concentration was then determined by difference. If the acid catalyst was a mixture of hydrofluoric acid, fluorosulfuric acid, and sulfuric acid, a batch of the catalyst was titrated with standard sodium hydroxide at a low temperature, and a first batch of the hydrolyzed product of this titrated mixture was titrated with standard sodium hydroxide, as described hereinabove. A second batch of the hydrolyzed product was titrated with a standard thorium solution in order to determine the concentration of fluoride ion from hydrofluoric acid and fluorosulfuric acid. The concentration of hydrofluoric acid was determined as the difference between the concentration of fluoride ion from hydrosulfuric acid and fluorosulfuric acid and the concentration of fluoride ion from fluorosulfuric acid. The concentration of sulfuric acid alone was then determined by difference.

The amount of acid-soluble impurities formed in the acid catalyst was determined by the difference in the total acid catalyst concentration at the start of a run and at the end of the run. The amount of diluent formed per unit time was estimated to be the ratio of this value to the run time. The product of this ratio with any particular time on stream, therefore, permits a calculation of the concentration of the acid-soluble diluent at any time during the run. The total amount of catalyst consumed during a time period was calculated as the amount of catalyst that would have to be removed at the end of the period and replaced by fresh catalyst in order to bring the catalyst composition back to its level at the beginning of the period. The amount of catalyst that was consumed was related to the amount of the alkylate produced and was reported as pounds of catalyst per gallon of alkylate.

The experimental conditions employed and the results obtained in seventeen alkylation runs involved in Example 1–31 are shown in Tables 1 and 2, respectively. Each alkylation run was performed under a pressure of about 70–90 pounds per square inch gauge and involved an isobutane-to-total olefin volume ratio of 4:1, a hydrocarbon flow rate of 30.8 milliliters per hour, and a mixture of 40 weight percent of isobutylene, 40 weight percent of 2-butene, and 20 weight percent of 1-butene as the olefinic alkylating agent, except Examples 23–24 and 29–31 which involved a mixture of 40 weight percent of isobutylene, 20 weight percent of 2-butene, and 40 weight percent of 1-butene as the olefinic alkylating agent.

Batches of hydrocarbon products were collected periodically during each alkylation run. The alkylate in each batch collected was analyzed shortly after being collected. Sequential alkylate batches collected during a particular time period during the alkylation run were combined. Each such time period corresponded to one Example. Thus, Examples 5 and 6 involved batches of alkylate collected during two different time periods in the same alkylation run. Examples 9–10 involved batches of alkylate collected during two different time periods in another single alkylation run. Examples 11 and 12 involved batches of alkylate collected during two different time periods in a third single alkylation run. Examples 14 and 15 involved batches of alkylate collected during two different time periods in a fourth single alkylation run.

TABLE 1

| Example | Catalyst Composition[1] Hydrofluoric Acid | Sulfuric Acid[2] | Fluorosulfuric Acid | Initial Concentration[1] of Acid-Soluble Oil in Catalyst | Volume of Acid Used[3] | Space Velocity[4] | Temperature[5] | Alkylation Run | Length of Run[6] | Averaging Period[7] From | To |
|---|---|---|---|---|---|---|---|---|---|---|---|
| 1 | 0 | 100 | 0 | 0 | 35 | 0.176 | 46 | 1 | 254 | 106 | 200 |
| 2 | 7 | 0 | 93 | 12 | 35 | 0.176 | 46 | 2 | 207 | 90 | 170 |
| 3 | 7 | 0 | 93 | 23 | 33 | 0.180 | 46 | 3 | 177 | 73 | 154 |
| 4 | 7 | 0 | 93 | 22 | 33 | 0.180 | 46 | 4 | 182 | 79 | 134 |
| 5 | 43.5 | 0.5 | 56 | 28.6 | 35 | 0.176 | 46 | 5 | 129 | 8 | 55 |
| 6 | 43.5 | 0.5 | 56 | 28.6 | 35 | 0.176 | 46 | 5 | 129 | 55 | 106 |
| 7 | 45.2 | 0.3 | 54.5 | 28.0 | 35 | 0.176 | 46 | 6 | 291 | 205 | 291 |
| 8 | 73.5 | 0.0 | 26.5 | 14.0 | 35 | 0.176 | 46 | 7 | — | 0 | 129 |
| 9 | 73.5 | 0.0 | 26.5 | 25.0 | 35 | 0.176 | 46 | 8 | 412 | 82 | 276 |
| 10 | 73.5 | 0.0 | 26.5 | 25.0 | 35 | 0.176 | 46 | 8 | 412 | 276 | 392 |
| 11 | 73.5 | 0.0 | 26.5 | 26.0 | 35 | 0.10 | 46 | 9 | 340 | 54 | 76 |
| 12 | 73.5 | 0.0 | 26.5 | 26.0 | 35 | 0.176 | 46 | 9 | 340 | 148 | 222 |
| 13 | 73.5 | 0.0 | 26.5 | 26.0 | 35 | 0.176 | 32 | 10 | 502 | 244 | 376 |
| 14 | 73.5 | 0.0 | 26.5 | 26.0 | 35 | 0.176 | 14 | 11 | 204 | 5 | 76 |
| 15 | 73.5 | 0.0 | 26.5 | 26.0 | 35 | 0.176 | 14 | 11 | 204 | 76 | 204 |
| 16 | 73.5 | 0.0 | 26.5 | 26.0 | 35 | 0.176 | 14 | 12 | 665 | 100 | 166 |
| 17 | 73.5 | 0.0 | 26.5 | 26.0 | 35 | 0.176 | 32 | 12 | 665 | 180 | 196 |
| 18 | 73.5 | 0.0 | 26.5 | 26.0 | 35 | 0.176 | 46 | 12 | 665 | 196 | 247 |
| 19 | 73.5 | 0.0 | 26.5 | 26.0 | 35 | 0.405 | 46 | 12 | 665 | 291 | 354 |
| 20 | 73.5 | 0.0 | 26.5 | 26.0 | 35 | 0.405 | 80 | 12 | 665 | 454 | 510 |
| 21 | 73.5 | 0.0 | 26.5 | 26.0 | 35 | 0.176 | 80 | 12 | 665 | 510 | 665 |
| 22 | 97 | 0.0 | 3 | 0 | 35 | 0.176 | 14 | 13 | 402 | 147 | 402 |
| 23 | 94 | 0.0 | 6 | 0 | 35 | 0.176 | 14 | 14 | 359 | 97 | 284 |
| 24 | 94 | 0.0 | 6 | 0 | 35 | 0.176 | 46 | 14 | 359 | 288 | 359 |
| 25 | 100 | 0.0 | 0.0 | 0 | 35 | 0.176 | 46 | 15 | 666 | 220 | 490 |
| 26 | 100 | 0.0 | 0.0 | 0 | 35 | 0.176 | 80 | 15 | 666 | 521 | 539 |
| 27 | 100 | 0.0 | 0.0 | 0 | 35 | 0.176 | 32 | 15 | 666 | 619 | 642 |
| 28 | 100 | 0.0 | 0.0 | 0 | 35 | 0.176 | 14 | 16 | 224 | 4 | 224 |
| 29 | 100 | 0.0 | 0.0 | 0 | 35 | 0.176 | 14 | 17 | 551 | 7 | 194 |
| 30 | 100 | 0.0 | 0.0 | 0 | 35 | 0.176 | 46 | 17 | 551 | 268 | 428 |
| 31 | 100 | 0.0 | 0.0 | 0 | 35 | 0.176 | 80 | 17 | 551 | 504 | 551 |

Footnotes
[1]Weight percent.
[2]The sulfuric acid component was made up of 98 weight percent of sulfuric acid and 2 weight percent of water.
[3]Milliliters.
[4]Volume of olefin per volume of catalyst per hour.
[5]°F.
[6]Hours.
[7]The number denotes the specific hour in the run.

TABLE 2

| Example | Concentration[1] of Trimethylpentanes in Alkylate in Averaging Period Maximum | Average | Results of Knock Tests for Combined Alkylates Produced During Averaging Period Research Octane Number | Motor Octane Number | Calculated Octane Number at Maximum Research Octane Number | Motor Octane Number | Time[2] of Maximum Trimethylpentane Concentration | Concentration[1] of Acid-Soluble Oil in Catalyst at Maximum Trimethylpentane Concentration | Catalyst Consumption[3] |
|---|---|---|---|---|---|---|---|---|---|
| 1 | 62.4 | 62.4 | 96.1 | 93.9 | 95.2 | 93.6 | 120 | 7 | 0.34 |
| 2 | 67.5 | 66.5 | 94.8 | 93.9 | 95.8 | 94.2 | 150 | 32.2 | 0.22 |
| 3 | 68.2 | 67.0 | 95.6 | 93.9 | 96.1 | 94.4 | 120 | 30.6 | 0.10 |
| 4 | 68.4 | 68.4 | 96.2 | 94.5 | 96.1 | 94.5 | 100 | 30.2 | 0.12 |
| 5 | 75.8 | 75.0 | 97.4 | 95.6 | 97.3 | 95.5 | 30 | 32 | 0.04 |
| 6 | — | 74.0 | 97.5 | 95.6 | — | — | — | — | 0.04 |
| 7 | 77.0 | 76.8 | 97.9 | 96.0 | 97.5 | 95.7 | 285 | 33 | 0.02 |
| 8 | — | 44.0 | — | — | — | — | — | — | — |
| 9 | 77.6 | 77.2 | 97.5 | 95.2 | 97.6 | 95.8 | 240 | 30 | 0.01 |
| 10 | — | 76.5 | 97.4 | 95.4 | — | — | — | 30 | 0.01 |
| 11 | — | 75.3 | — | — | — | — | — | — | 0.01 |
| 12 | 77.7 | 77.4 | 97.2 | 95.2 | 97.6 | 95.8 | 180 | 30 | 0.01 |
| 13 | 79.9 | 79.5 | 97.5 | 95.4 | 98.0 | 96.2 | 290 | 30 | 0.01 |
| 14 | 83.7 | 83.0 | 97.9 | 96.5 | 98.6 | 96.7 | 60 | 28 | 0.01 |
| 15 | — | 82.1 | 98.2 | 96.1 | — | — | — | 28 | 0.01 |
| 16 | 83.8 | 83.8 | 98.7 | 96.2 | 98.7 | 96.7 | 80 | 28 | 0.01 |
| 17 | 79.7 | 79.7 | — | — | 98.0 | 96.2 | 190 | 28 | 0.01 |
| 18 | — | 76.7 | 96.8 | 95.2 | — | — | — | 28 | 0.01 |
| 19 | 76.5 | 76.5 | — | — | 97.4 | 95.6 | 320 | 28 | 0.01 |
| 20 | 66.3 | 63.8 | — | — | 95.8 | 94.1 | 454 | 28 | — |
| 21 | 65.4 | 62.8 | — | — | 95.6 | 93.9 | 510 | 28 | — |
| 22 | 77.5 | 76.5 | 96.9 | 94.8 | 97.6 | 95.8 | 238 | 15 | 0.01 |
| 23 | 72.1 | 71.8 | 95.5 | 94.0 | 96.7 | 95.0 | 280 | 20 | 0.01 |
| 24 | 69.5 | 67.6 | 95.5 | 94.5 | 96.5 | 94.7 | 359 | 25 | 0.01 |
| 25 | 74.0 | 74.0 | 96.9 | 95.1 | 97.1 | 95.3 | 350 | 7 | 0.01 |
| 26 | — | 61.2 | 94.2 | — | 95.0 | 93.4 | — | — | — |
| 27 | — | 73.0 | — | — | 96.9 | 95.1 | — | — | 0.01 |
| 28 | 70.4 | 70.0 | 95.5 | 94 | 96.5 | 94.8 | 4 | 2 | 0.01 |
| 29 | 57.5 | 57.1 | 90.3 | 90.4 | 95.5 | 92.8 | 190 | 4 | 0.01 |
| 30 | 63.0 | 61.7 | 93.4 | 91.9 | 95.3 | 93.7 | 340 | 7 | 0.01 |
| 31 | — | 58.0 | — | — | 94.6 | 93.1 | — | — | — |

Footnotes
[1]Weight percent.
[2]Hours.
[3]Pounds of catalyst per gallon of alkylate.

Examples 16-21 involved batches of alkylate collected during six different time periods in a fifth single alkylation run. Examples 23 and 24 involved batches of alkylate collected during two different time periods of a sixth single alkylation run. Examples 25-27 involved batches of alkylate collected during three different time periods of a seventh single alkylation run. Examples 29-31 involved batches of alkylate collected during three different time periods of an eight single alkylation run. On the other hand, a different alkylation run was involved in each of Examples 1-4 and 7-8, 13, 22, and 28. The alkylation run, length of the alkylation run, and the particular time period in the run during which batches were collected and combined, are shown in Table 1.

The largest measured trimethylpentane content during the relevent time period and the time at which the alkylate with the largest trimethylpentane content is produced are reported in Table 2. The average trimethylpentane content of the combined batches involved in a particular Example was then estimated by dividing the sum of the products of the trimethylpentane content of a given batch times the volume of that batch for each batch combined by the total volume of all such batches combined in that Example. The octane rating of each of these combined batches was then determined by the knock test.

Figure 2:
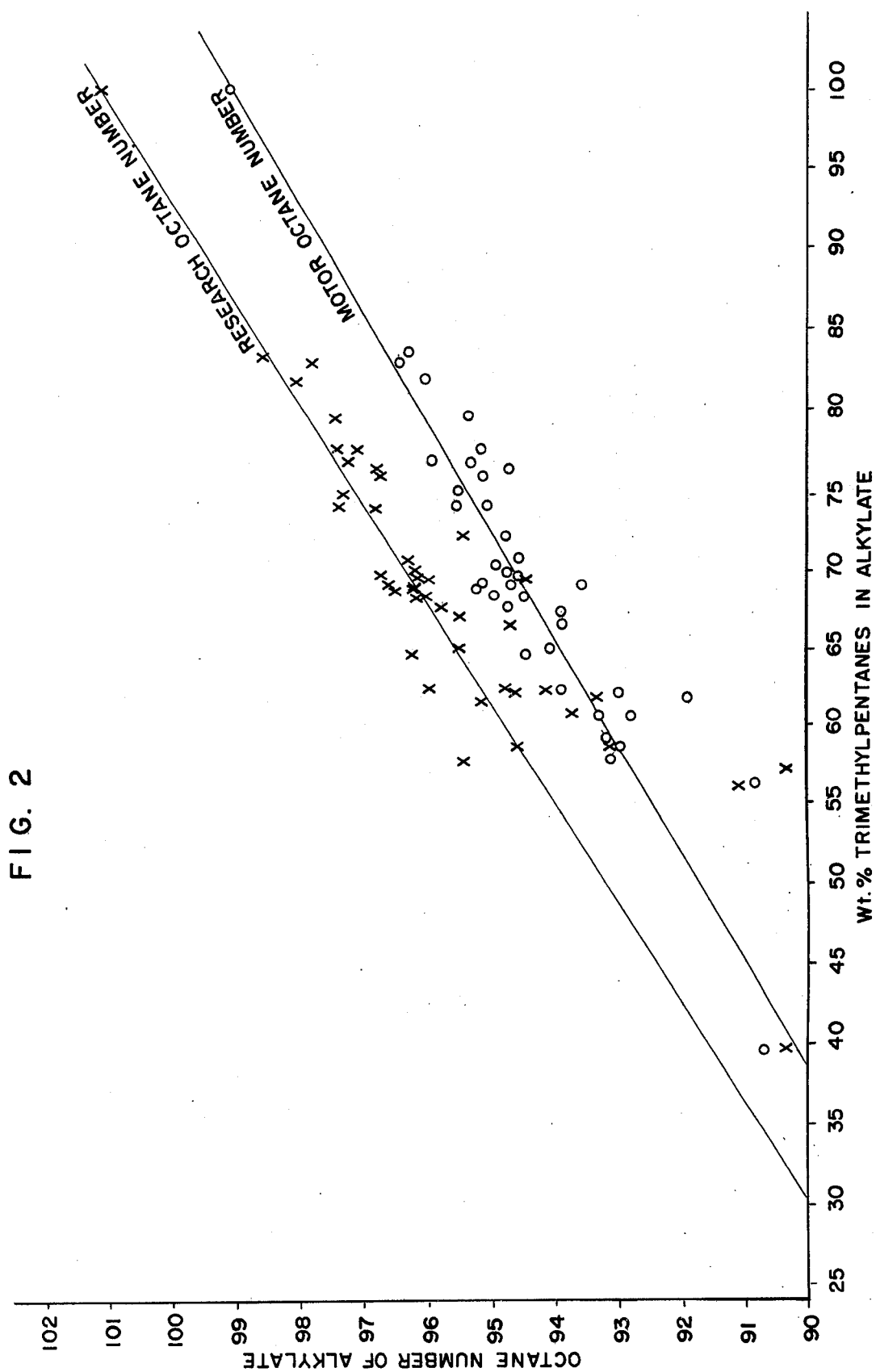
FIG. 2 is a plot of the motor and research octane numbers of a number of alkylates versus the total trimethylpentane content of each of the alkylates.

Octane numbers were calculated from the maximum trimethylpentane content. Empirical relationships between both research and motor octane numbers and the total trimethylpentane concentration in an alkylate were determined from the plots of measured values of research and motor octane numbers versus measured total concentrations of trimethylpentane in alkylate, as shown in FIG. 2. The best straight lines through the plots in FIG. 2 were determined visually. From these straight lines, the following correlations were found:

$Y_1 = .165 X + 84.9$
$Y_2 = .15 X + 84.2$ where X is the total concentration of trimethylpentanes in the alkylate, and $Y_1$ and $Y_2$ are the research and motor octane numbers, respectively. These correlations permit estimates to be made of octane numbers for an alkylate from its trimethylpentane content. Comparison of the calculated octane numbers with those determined using the knock test in Table 2 illustrates that qualitative trends in alkylate quality can be predicted equally well by both.

Comparison of the results in Table 2 indicates that the extent of catalyst consumption in the alkylations using the catalyst system of this invention was less than in the alkylations using the catalyst system containing sulfuric acid alone. Further, the alkylate produced in an alkylation using a catalyst system containing at least 50 weight percent of hydrofluoric acid and at least 2 weight percent of fluorosulfuric acid had a higher octane rating than the alkylates produced using catalyst systems containing either sulfuric acid alone or a mixture of hydrofluoric and fluorosulfuric acids containing less than 50 weight percent of hydrofluoric acid. These results illustrate the unexpected improvement in alkylate quality and catalyst lifetime achieved by using a catalyst system comprising at least 50 weight percent of hydrofluoric acid and at least 2 weight percent of fluorosulfuric acid. Further, these results indicate that the catalyst system of this invention has a maximum efficiency with hydrofluoric acid in the range of about 74 weight percent and fluorosulfuric acid in the range of about 26 weight percent and falls off in efficiency at higher and lower concentrations of these components.

I claim:
1. In a process for conducting a liquid-phase alkylation of at least one alkylatable isoparaffin with at least one alkylating agent selected from the class consisting of an olefin and an alkyl sulfate ester in the presence of a mixture of hydrofluoric acid and fluorosulfuric acid as the alkylation catalyst, under alkylation conditions, and in an alkylation reactor, to thereby produce hydrocarbons boiling in the gasoline range, the improvement comprising reacting at least one said alkylatable isoparaffin and at least one said alkylating agent in the presence of a catalyst comprising a major amount of hydrofluoric and a minor amount of fluorosulfuric acid, to thereby produce a high-octane product and to extend the effective life of the catalyst.

2. The process of claim 1 wherein said alkylatable isoparaffin contains from 4 to 10 carbon atoms.

3. The process of claim 2 wherein said alkylatable isoparaffin is isobutane.

4. The process of claim 1 wherein said alkylating agent in an olefin containing from 3 to 10 carbon atoms.

5. The process of claim 4 wherein said olefin is a mono-olefin containing from 3 to 5 carbon atoms.

6. The process of claim 5 wherein said mono-olefin contains 4 carbon atoms.

7. The process of claim 6 wherein said mono-olefin is a straight-chain compound.

8. The process of claim 7 wherein the alkylatable isoparaffin is isobutane and trimethylpentanes are produced.

9. The process of claim 1 wherein said catalyst comprises hydrofluoric acid in an amount in the range of from at least 50 to about 98 weight percent and fluorosulfuric acid in an amount of at least 2 weight percent of the catalyst.

10. The process of claim 9 wherein said catalyst consists essentially of hydrofluoric acid and fluorosulfuric acid.

11. The process of claim 9 wherein said catalyst comprises hydrofluoric acid in an amount in the range of from at least 60 to about 85 weight percent and fluorosulfuric acid in an amount of at least 15 weight percent of the catalyst.

12. The process of claim 11 wherein said catalyst consists essentially of hydrofluoric acid and fluorosulfuric acid.

13. The process of claim 1 wherein the reaction is conducted under at least sufficient pressure to maintain said alkylatable isoparaffin, said alkylating agent, and said catalyst substantially in the liquid phase under the conditions obtained.

14. The process of claim 1 wherein the reaction is conducted at a temperature in the range of from about −30°C. to about 30°C.

15. The process of claim 16 wherein the reaction is conducted at a temperature in the range of from about −15°C. to about 20°C.

16. The process of claim 1 wherein the volume ratio of alkylating agent-to-catalyst per hour is in the range of from about 0.05 to about 5.0.

17. The process of claim 1 wherein the molar ratio of alkylatable isoparaffin-to-alkylating agent is at least 2:1.

18. The process of claim 17 wherein the volume ratio of alkylating agent-to-catalyst is in the range of from about 0.1 to about 2.0.

* * * * *

UNITED STATES PATENT OFFICE
CERTIFICATE OF CORRECTION

PATENT NO. : 3,928,487
DATED : November 27, 1974
INVENTOR(S) : David A. Mc Caulay It is certified that error appears in the above-identified patent and that said Letters Patent are hereby corrected as shown below:

After the title, under "Assignee, change "STANDARD OIL COMPANY" to -- AMOCO OIL COMPANY --

Column 4, line 22, "is an" should be -- in an --.

"   5   "  12, After "any" add -- suitable --;
"   5   "  59, Change "catalyst" to -- catalysts --.

"  10       In the headings, after "Temperature" add a super 5.

"  11   "   9, "Eight" should be -- eighth --.

"  12   "  21, "in" should be -- is --;
"  12   "  66, Claim 18 should read -- 18. The process of Claim 16 --

Signed and Sealed this twentieth Day of April 1976

[SEAL]

Attest:

RUTH C. MASON
*Attesting Officer*

C. MARSHALL DANN
*Commissioner of Patents and Trademarks*